Oct. 28, 1969  W. A. MORRIS ET AL  3,474,486
DETACHABLE HANDLE FOR COOKING WARE
Filed June 12, 1964  4 Sheets-Sheet 4
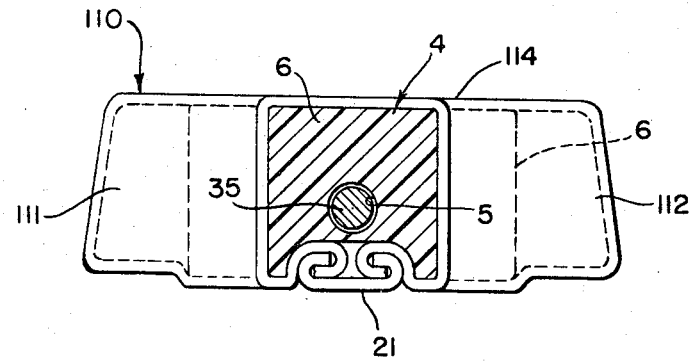
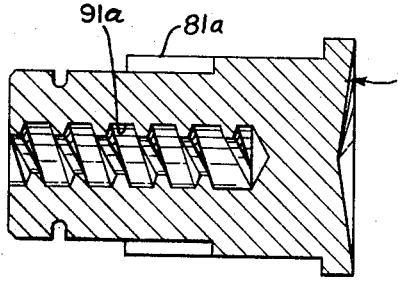
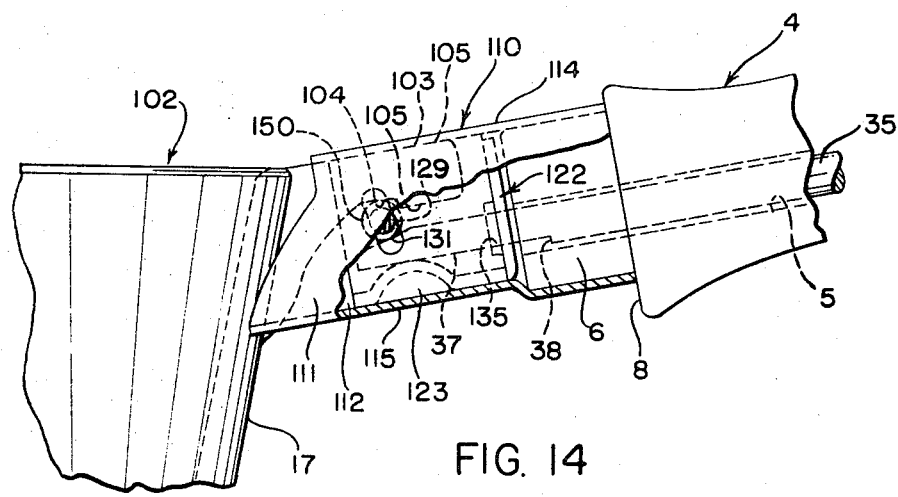
INVENTORS.
ANTHONY W. SERIO &
WILLIAM L. MORRIS
BY
*Fay & Fay*
ATTORNEYS

# United States Patent Office 3,474,486
Patented Oct. 28, 1969

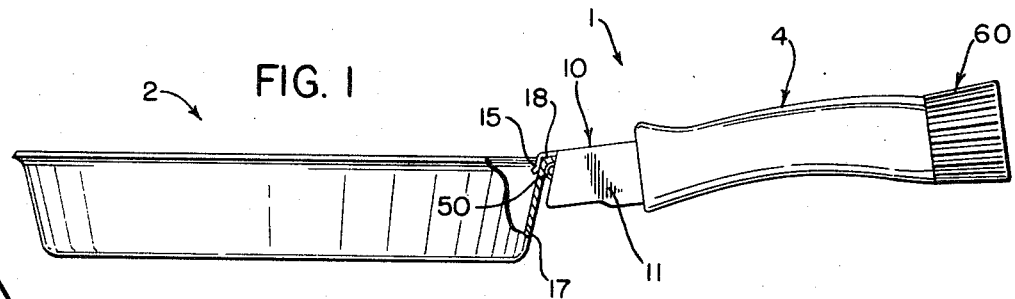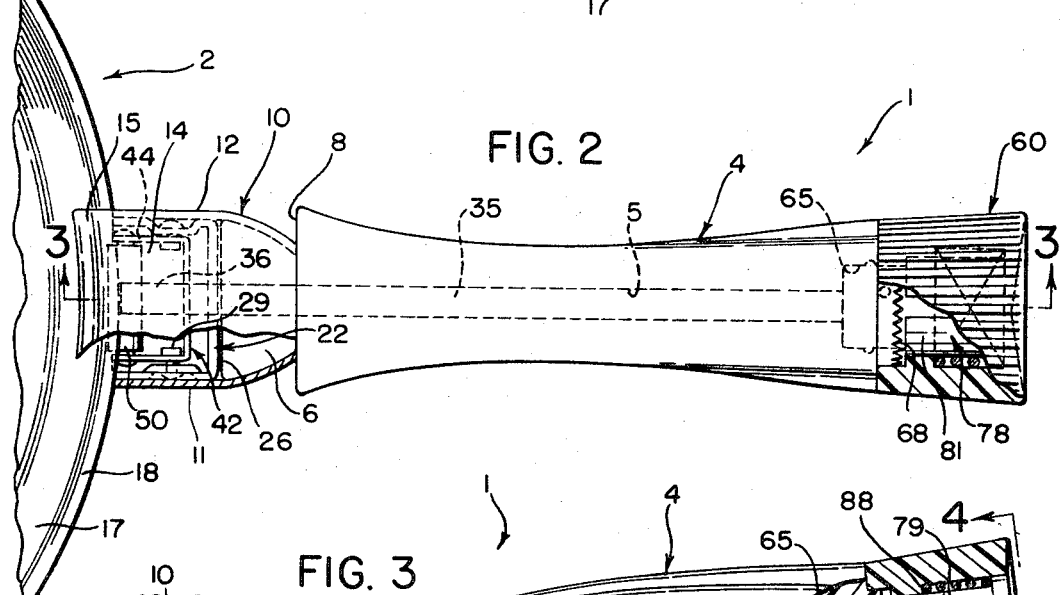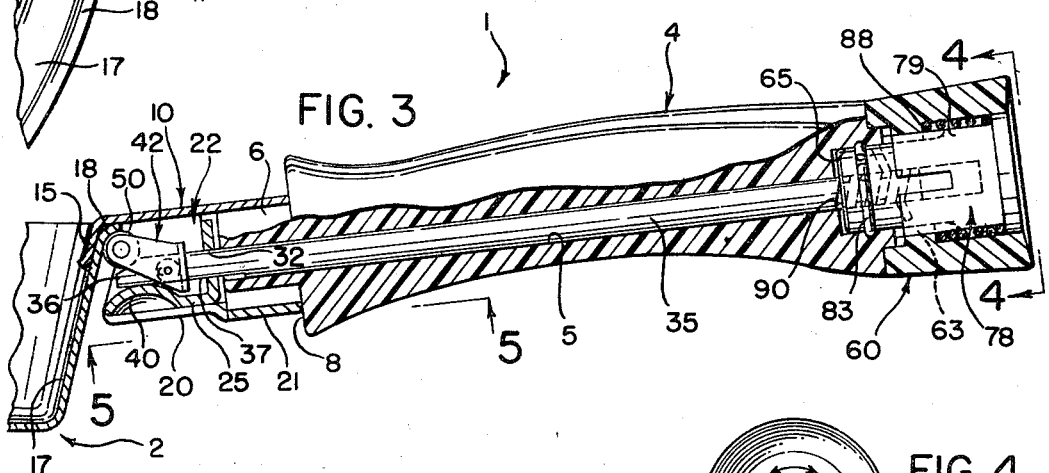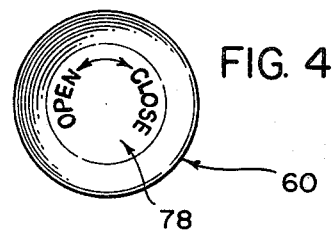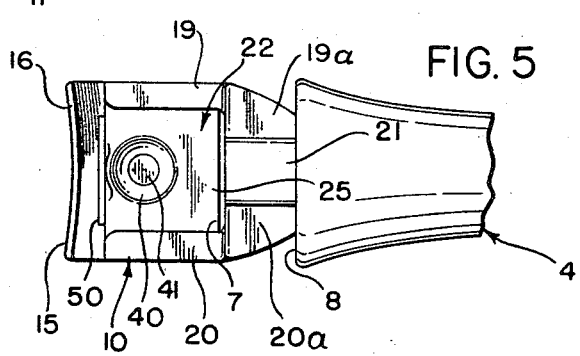

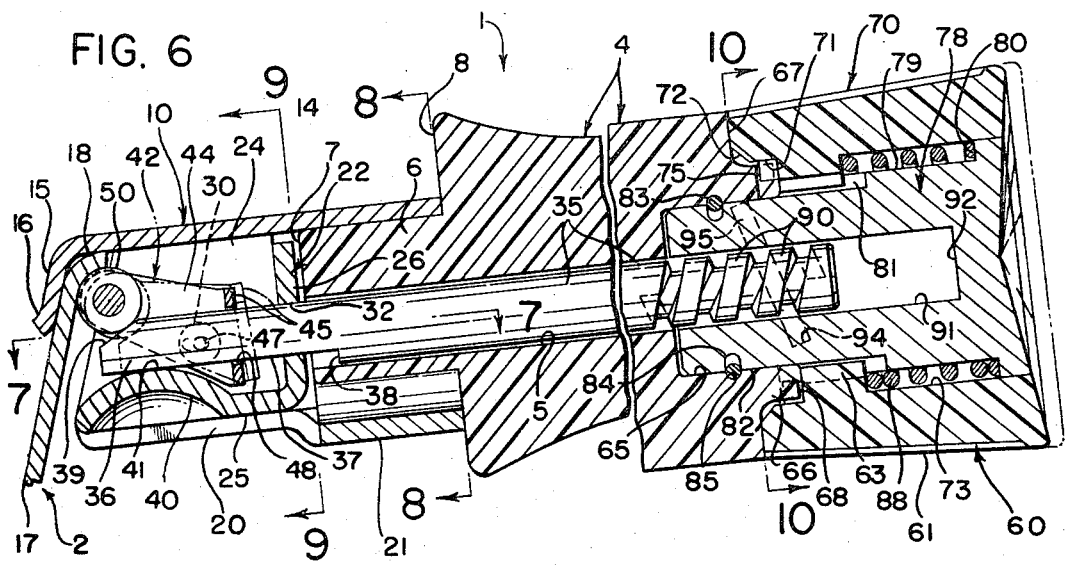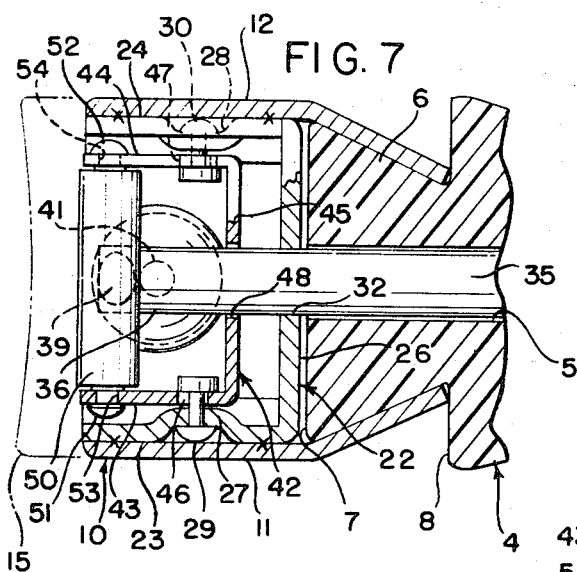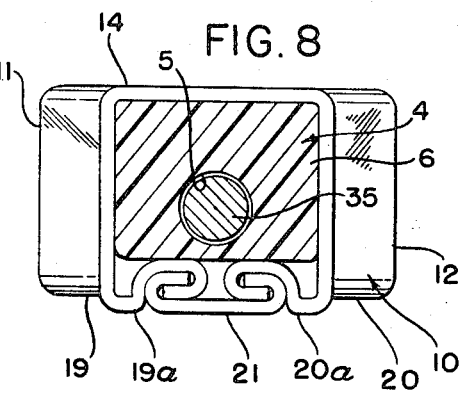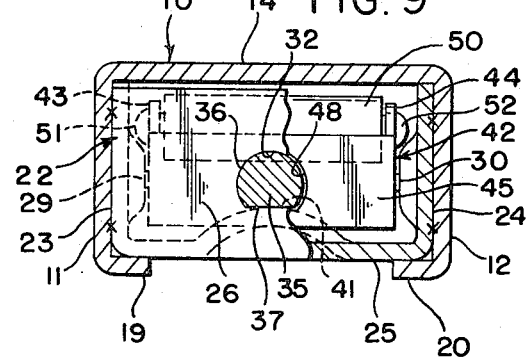

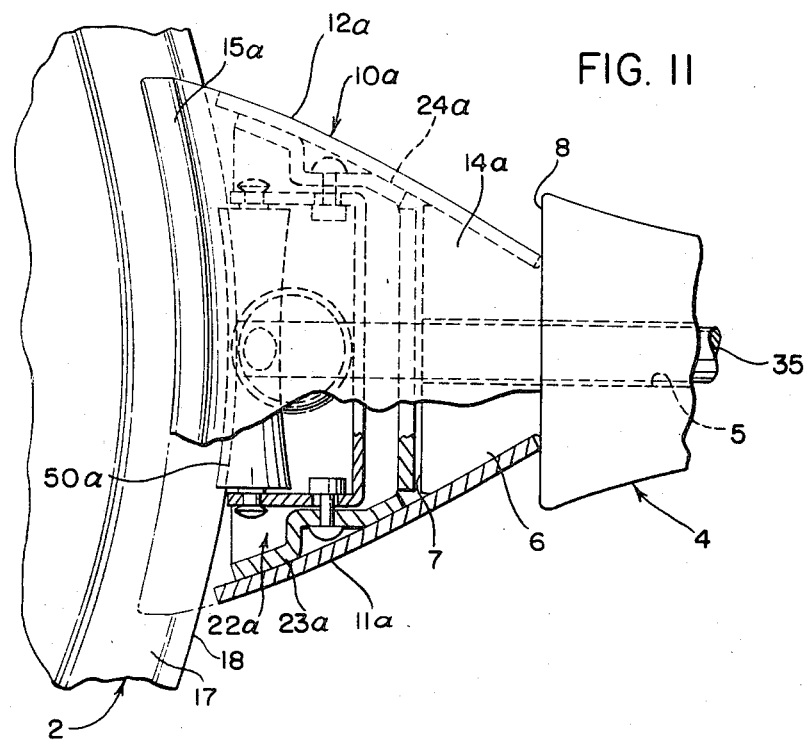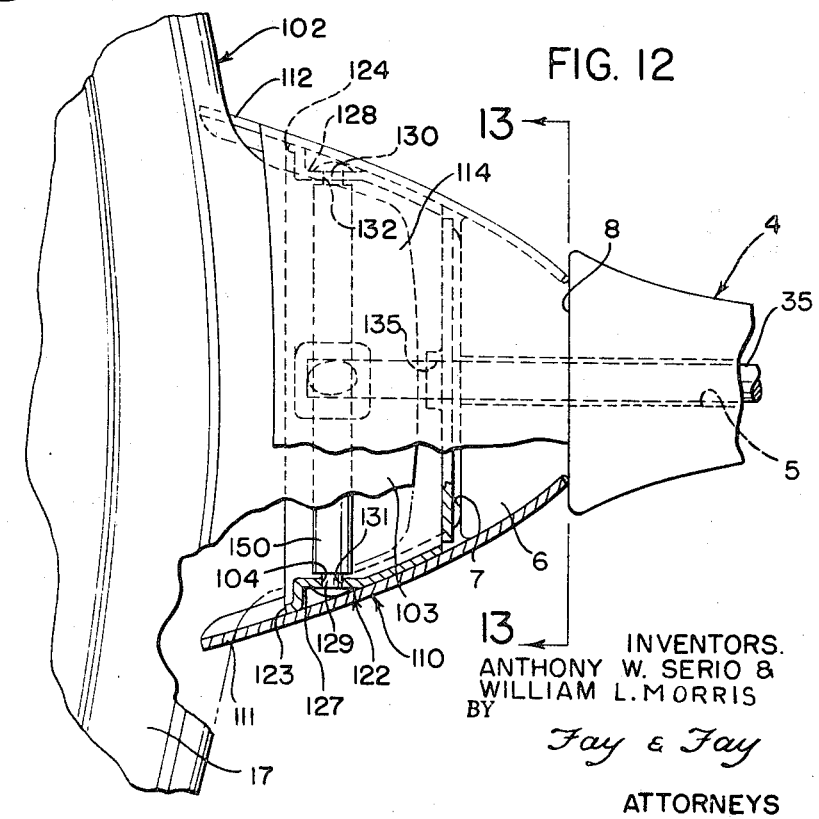

3,474,486
DETACHABLE HANDLE FOR COOKING WARE
William A. Morris and Anthony W. Serio, Elmira, N.Y.;
said Morris assignor to The Youngstown Steel Door
Company, Cleveland, Ohio, a corporation of Ohio
Filed June 12, 1964, Ser. No. 378,482
Int. Cl. A47j 45/10, 45/00
U.S. Cl. 16—114    6 Claims

ABSTRACT OF THE DISCLOSURE

The improved detachable handle for cooking vessels of the instant invention is designed for cooking vessels having either a simple flared lip or a handle extension lip on the body portion of the vessel. The detachable handle comprises an elongated insulating handle member or gripping surface having an element on one end which defines a body member. The elongated insulating handle member has a bore extending from the end having the body member thereon to its opposite end. The body member has spaced side walls and a first vessel lip engaging means which lies between the side walls. An elongated second lip engaging means is mounted between the side walls of the body member in opposing spaced relation to the first lip engaging means so that the second means is capable of limited lateral movement toward the first means. An elongated nonrotatably mounted shaft or operating member is slidably mounted in the handle bore and projects from the bore for axial movement into and out of engagement with the second lip engaging means at a point intermediate the ends of said second means. When the elongated member engages the second lip engaging means, it forces it laterally toward the first means thereby to exert a clamping force on the vessel lip inserted therebetween. Special means are provided for selectively actuating the operating member over a range of axial positions to perform the clamping and unclamping operation, with the provision of a convenient positive lock which will prevent inadvertent detachment of the handle from the pan during use.

---

This invention relates to detachable handles for cooking ware vessels. It has been recognized in the marketing of cooking ware that there are commercial and practical advantages to providing one handle for several sizes of pans or cooking vessels. The concept of detachable handle cooking ware permits a variety of sizes of pans to be provided at lower cost and greater convenience to the consumer.

An important aspect of the consumer convenience is the simplification of storage permitted by the detachable handles in that the bodies of the dishes or pans may be nested together and the single handle stored elsewhere without taking up a large amount of cupboard or shelf space.

Detachable handles provide other advantages to the consumer in that when they are used on cooking ware for use in ovens, it is not necessary to place them in the oven with the dish. Oven heat has a tendency to deteriorate most thermal insulating materials and also has the immediate effect of making the handle too hot to grip manually without auxiliary thermal insulating means such as a hot pad. The use of a detachable handle permits the handle to remain out of the oven so that it is cool enough to manipulate for taking heated casseroles or other dishes from the oven.

There is another advantage in using elongated detachable handles, particularly in the larger cooking ware such as casseroles, in that they can convert these dishes which normally require two hands to carry when full for single hand manipulation so that the other hand is free for flame control, stirring, or serving directly from the vessel.

Heretofore, many attempts were made to produce a safe, fast-acting, and inexpensive detachable handle for cooking ware which was also attractive enough to appeal to consumers. None of the prior art attempts, however, have been able to accomplish all of these purposes, and each of the attempts has been an unsatisfactory compromise between the safety, convenience, and expense factors.

Accordingly, it is an object of this invention to provide a detachable handle for cooking ware which is safe, convenient, inexpensive, and attractive.

It is a more specific object to provide a detachable handle for cooking ware vessels which is positive acting, and therefore extremely safe from the user's standpoint, and which will not detach by inadvertent actuation of the locking means or twisting of the vessel body out of the clamping means of the handle.

It is a further object of the invention to provide a fast-acting detachable handle for cooking ware so that it may be quickly attached to cooking vessels for removing them from ovens without exposing the hand of the user to the heat of the oven for a long period of time.

It is a further object of the invention to provide an inexpensive detachable handle for cooking ware by the elimination of glued joints and the drying time they require and the elimination of close tolerance fragile parts such as cams which require extensive quality control procedures.

It is an additional object of the invention to provide an improved detachable handle operating mechanism of simplicity and versatility which is adaptable for use for simple flared lip pans or dishes or for use on casseroles or dishes having handle extension lips on the bodies thereof.

Other and more specific objects of the invention will be apparent from the detailed description to follow.

In the drawings:

FIG. 1 is a side elevational view of one embodiment of the detachable handle of the invention mounted on a simple flared lip pan.

FIG. 2 is an enlarged top plan view of the detachable handle of FIG. 1 with parts broken away for clarity.

FIG. 3 is a cross-sectional elevational view of the detachable handle taken on line 3—3 of FIG. 2.

FIG. 4 is an end elevational view taken along the line 4—4 of FIG. 3.

FIG. 5 is a bottom view taken along the line 5—5 of FIG. 3.

FIG. 6 is a further enlarged detailed cross-sectional elevational view of the detachable handle of FIG. 1.

FIG. 7 is a fragmentary cross-sectional view taken along the line 7—7 of FIG. 6.

FIG. 8 is a cross-sectional view taken along the line 8—8 of FIG. 6.

FIG. 9 is a cross-sectional view taken along the line 9—9 of FIG. 6.

FIG. 10 is a cross-sectional view taken along the line 10—10 of FIG. 6.

FIG. 11 is a top plan view of a modification of the detachable handle of FIGS. 1–10 with parts broken away for clarity.

FIG. 12 is a top plan view of an embodiment of the invention for use with vessels having a handle extension lip on the rim or body of the vessel with portions of the lip and handle broken away for clarity.

FIG. 13 is a cross-sectional view taken along the line 13—13 of FIG. 12.

FIG. 14 is a side elevational view of the detachable handle embodiment of FIG. 12.

FIG. 15 is a cross-sectional view of an alternative embodiment illustrating a plug for use with the detachable handles of this invention.

In the embodiment illustrated in FIGS. 1–10, the numeral 1 generally designates the detachable handle and the numeral 2 generally designates a simple flared lip pan to which it is attached.

The handle 1 comprises a hollow insulating gripping member 4 which is of suitable material such as wood, Bakelite, or other heat resistant synthetic resin material. The synthetic resin based plastic materials are preferred because they are good thermal insulators and may be easily molded and cut to the shape desired. The insulating handle member 4 has a bore 5 therethrough and an end portion 6 having a tapered or curved contour with its largest overall dimension nears its end 7 and its smallest dimension adjacent a shoulder 8 on the gripping surface portion end adjacent to the extension 6. This shape provides a dovetailed portion for easy attachment of a metal body member 10 which encloses the clamping means for attachment of the handle to the flared lip of the pan 2.

The metal body member 10 comprises two side walls, 11 and 12, on either side of a top central portion 14 which acts as both the top enclosure means for the mechanism and the upper or fixed member of the clamping means for engaging the flared lip of a pan or dish. The forward portion 15 of the top 14 extends downwardly and adjacent its lowermost end 16 is given a slight outward turn to permit the flared lip of the pin 2 to be easily passed behind. The downwardly extending portion 15 makes an angle with the top portion 14 substantially equal to the angle that the side wall 17 of the pan 2 makes with the flared lip portion 18 of the pan 2 so that the pan may be nested within the angle and contact the inner surfaces of both the downwardly extending portion 15 and the top member 14 from which it extends. The sidewalls 11 and 12 of the metal handle body 10 have inwardly depending flanges 19 and 20 extending from their lowermost ends in substantially parallel relationship to the top portion 14. This makes a generally rectangular channel member of the body 10 with an opening in the central portion of the lowest side which is defined by the flanges 19 and 20. The side walls 11 and 12 project rearwardly until they enclose the hollow handle extension portion 6 and substantially abut the shoulder 8. Because of the generally tapered shape of the sides of the handle extension portion 6, the portions 11, 12, 14, 19, and 20 of the metal body 10 may be formed to conform with the body 6 and form an interlocking dovetailed relationship with it such that the metal body portion 10 is rigidly mounted on the handle 4.

The integrity of the dovetailed relationship is assured by means of reversely and downwardly bent extensions 19a and 20a of the inwardly extending flanges 19 and 20 abutting the underside of handle extension 6. As best seen in FIG. 8, a generally C-shaped body clip 21 of suitable metal is interlocked within the adjacent and oppositely opening hooked portions formed by the shaped extensions 19a and 20a. In manufacturing this illustrated embodiment, the body clip is deformed to maintain a substantially flush surface with the flange extensions 19a and 20a slightly below the plane of flanges 19 and 20.

Telescopingly received or nested against the side walls 11 and 12 and the flanges 19 and 20 is a holding means 22 for holding the movable locking pin or second member of the clamping means. The holding means 22 is a generally U-shaped member having side walls 23 and 24 in face-to-face relation with the side walls 11 and 12 of the body 10 and a bottom wall 25 seated against the inner suitably secured as by spot welds between the walls 11 23 and 24 preferably abut against the top of the body 10. The holding means 22 has a rear wall portion 26 which is either slightly spaced from or which substantially abuts the surface 7 on the end of the handle extension portion 6 of the handle 4. It will be seen that the holding means 22 is snugly nested inside of the metal handle body 10 and suitably secured as by spot welds between the walls 11 and 23 and 12 and 24 except at central portions thereof where the side walls 23 and 24 are depresesd inwardly away from the walls 11 and 12 to form seats 27 and 28 for the heads of rivets 29 and 30. In the central areas of the depressions 27 and 28 are holes for the shanks of rivets 29 and 30 which pass therethrough and extend inwardly to the central area of the holding means 22.

In the rear wall 26 of holding means 22, in axial alignment with the bore 5 of the insulating handle 4, a hole 32 is provided of the same diameter as the bore 5 except that the bottom portion of the hole for about 45° on either side of a vertical diameter has a horizontal flat surface portion so that the hole 32 is symmetrical about the vertical axis but is not circular. Disposed within the bore 5 of the handle 4 is a shaft 35 which has an end portion 36 which projects into the holding member 22 through the hole 32. The end portion 36 of the shaft or operating member 35 is of a complementary cross-section to the hole 32 and is therefore prevented from rotating with respect to it by a flat 37 corresponding to the flat surface portion of the hole 32. The flat 37 on the shaft 35 extends from the forward end, rearwardly to a point at which a shoulder 38 on the shaft is disposed. The location of the shoulder 38 is important because it is this shoulder 38 coming into engagement with the rear wall 26 of the holder 22 which limits the forward movement of the shaft 35 to a desired extent. A beveled surface 39 is disposed on the end of the shaft portion 36 at its topmost and forwardmost point. A depression or embossment 40, preferably having a flat topmost surface 41, is provided in the bottom 25 of the holding member 22 to give added support to the projecting portion 36 of the shaft 35 as well as further insuring that the shaft will not rotate but will be free for limited axial movement.

It will be obvious that the hole 32 in cooperation with the flat 37 on the shaft would be sufficient alone to prevent rotation of the shaft 35 and that the depression 40 with its flat top surface 41 could be omitted, if desired. The depression 40 does add support, however, for the projecting end of the shaft; and for this reason, its presence improves the structure.

Mounted on the holder 22 by means of rivets 29 and 30 and loosely disposed upon the projecting portion 36 of the shaft 35 is the lower or movable clamping element structure. A generally U-shaped bracket member 42 having arms 43 and 44 respectively is oriented in a substantially parallel relationship to the walls 23 and 24. A rearward wall 45 on the bracket 42 supports and separates the arms 43 and 44 in spaced relationship to each other. The arms 43 and 44 have slots 46 and 47 respectively through which the shanks of rivets 29 and 30 extend with the inner rivet heads located adjacent the innermost surfaces of the arms. The member 42 is free to move to the extent of the slots 46 and 47. A hole 48 is provided in the rear wall 45 of the member 42 of slightly larger size but of substantially complementary shape to the projecting portion 36 of the shaft 35. The slightly enlarged size of the hole 48 permits slight pivotal movement of the member 45 in an upward and downward direction with respect to the shaft 35 such that the bracket 42 is capable of moving axially the distance permitted by slots 46 and 47 and pivoting vertically the distance permitted by the enlarged size of the hole 48 relative to the projecting shaft portion 36.

A generally cylindrical locking pin or clamping surface 50 is mounted between arms 43 and 44 on suitably headed pins 51 and 52 disposed in holes 53 and 54 in the ends of the arms 43 and 44 respectively. It will be seen that the length of the arms 43 and 44 are related to the length of the projecting portion 36 of the shaft and the distance from the exposed end of the portion 36 to the shoulder 38 so that the flat beveled surface portion 39 on the shaft 35 will be in substantially continuous engagement with the pin 50 whether the pin 50 is in its maximum upward pivoted position or its maximum lower pivoted position as dotted in in FIG. 6. The pin 50 is preferably of metal or some suitable plastic material to prevent marring of the flared lip 18 of the pan 2 upon engagement therewith. It will be seen that the dimension of the pin 50 is such that it fits snugly within the radius of curvature on the angle formed by the portions 17 and 18 and the pan 2.

At the opposite end of the handle grip portion 4 a novel structure is provided for axial movement of the operating member or shaft 35. A knob 60 located at the end of the hollow insulating handle 4 in coaxial alignment with the bore 5 and of the same material as the handle member 4 has knurls or elongated ridges and furrows 61 on the outer surface thereof. The knob 60 is substantially hollow and has a plurality of straight teeth or splines 63 located intermediate its ends within its central bore.

The adjacent end of the hollow insulating handle member 4 has a counterbored portion 65 in coaxial communication with the bore 5 and an extension portion 66 which elongates the coaxial bore 65 past the major outside dimension of the handle 4 as defined by a shoulder 67 concentrically located on the outer portion of the hollow handle body. The end of the extension 66 is provided with a plurality of relatively sharply pointed teeth 68 which extend axially of the handle toward the plastic knob 60. The plastic knob 60 has an outer extension portion 70 of a shape which permits face-to-face abutting relationship with the shoulder 67 of the handle and which is provided with a counterbored portion 71 with beveled inner edges 72 thereon. At the base of the counterbore is a plurality of serrated and axially extending teeth 75 of a shape complementary to the teeth 68 on the end of the hollow handle body 4 such that a close interfitting of the teeth is effected when the extension portion 70 of the knob 60 is flush against the shoulder 67 on the handle body 4. The function of the intermeshed teeth 68 and 75 is to prevent relative rotation between the knob and the handle 4 when they are in engagement. Mounted within the hollow central opening of the knob 60 is a splined plug 78 having an overall diameter slightly smaller than the diameter of a counter-bored portion 73 of the outer end of the central bore of the hollow splined knob 60. The plug 78 has a reduced diameter portion 79 beginning at a shoulder 80 situated a relatively short distance into the central bore portion 73 of the knob 60. The reduced diameter portion 79 is cylindrical and merges into outwardly extending spline teeth 81 which are of a complementary shape to the inwardly extending spline teeth 63 on the knob 60. In this manner, the rotation of the knob 60 drives the plug 78 with it through the spline teeth 63 and 81.

On the innermost end of the splined plug 78 a further reduced diameter portion 82 is provided such that it extends into the base of the counterbore 65. The assembled relationship between the handle 4, the plug 78, and the knob 60 is maintained by a suitable annular retaining ring 83 mounted in a groove 84 in the plug 78 and a groove 85 in the handle 4 opposite thereto. The groove 84 is greater in depth than the cross-sectional diameter of the retaining ring 83 such that the retaining ring may be compressed within the confines of the plug 78 for inserting into the counterbore 65 during assembly. Groove 85 is of lesser depth than the cross-sectional diameter of the retaining ring 83 so that when seated therein it extends into both the groove 84 and the groove 85 to retain the plug against axial movement relative to the handle.

Between the spline teeth 63 and the shoulder 80 of the plug 78 a coil spring 88 is disposed around the plug 78 to urge the knob 60 inwardly in abutting relationship to the handle 4 adjacent the shoulder 67. When in this relationship, of course, the teeth 75 of the handle 4 are engaged with the teeth 68 of the knob 60 such that relative rotation between the handle 4, splined knob 60, and plug 78 will not occur inadvertently.

On the end portion of the shaft or operating member 35 opposite the end portion 36 is a threaded end portion 90 having a left-handed thread cut into the shaft. The end portion 90 extends into the plug 78 in a central bore 91 coaxially aligned with the bore 5 of the handle 4 and having a bottom 92. Transverse of the bore 91 in plug 78 and intercepting it from a point near the groove 84 is a blind hole 94 situated such that a pin 95 mounted therein is in operative engagement with the threaded portion 90. It will be seen that the angle of the bore 94 and the pin 95 with respect to the axis of the bore 91 is equal to the helix angle of the threaded portion 90 and the shaft 35. This arrangement is such that rotation of the plug 78 will drive the operating member or shaft 35 in an axial direction without rotation of the shaft which is, of course, prevented by the co-operation of the flat 37 with the opening 32 and the depression or embossment 40. As previously explained, the shoulder 38 on the shaft 35 prevents the forward advancement of the shaft 35 beyond the desired maximum limit. The base 92 of the bore 91 in the plug 78 acts as a stop when the end portion 90 of the shaft 35 is moved axially into engagement therewith.

Accordingly, it will be recognized that to axially move the operating member 35 it is merely necessary to pull the plastic knob 60 against the biasing force of spring 88 until the teeth 68 and 75 disengage and permit relative rotation of the plastic knob 60 and the handle 4. Upon rotation of the knob 60 in a clockwise direction, the spline teeth drive the plug 78, and the operating member or shaft 35 advances to engage the clamping means 50 and move it toward the clamping means 15. Upon release of the knob 60 the spring 88 biases the knob 60 toward the handle 4 to reengage the teeth 68 and 75 to prevent inadvertent rotation of the knob 60 and corresponding unclamping by axial movement of the shaft 35.

As previously described, the rotation of the knob 60 drives the shaft 35 through the spline teeth 63 of the knob engaging and driving the teeth 81 of the plug 78. The length of the spline teeth 63 and 81 is such that the spline teeth 63 and 81 are in continuous positive engagement regardless of the axial position of the knob 60 relative to the plug 78 and handle 4. The pin 95 because of its bore 94 being closed by the surface of counterbore 65 of the handle 4 remains substantially in the same axial position but rotates about the shaft 35 in the helical path of the threaded portion 90 to drive the shaft axially.

As a variation of the structure illustrated, the plug 78a as shown in FIG. 15 may have threads 91a for engagement with the threaded portion 90 of the shaft within its bore 91 or a metal nut may be molded in the plug 78a for engagement with the threaded portion 90 of the shaft instead of the pin 95. The reduced diameter portion of plug 78a merges into outwardly extending spline teeth 81a, which, like in the embodiment of knob 78, shown in FIG. 6, are complementary in shape to the spline teeth 63 on knob 60.

Another obvious modification which eliminates the safety feature of the positive locking would be to eliminate the axial movement of the plastic knob 60 relative to the handle 4 and to eliminate the teeth 68 and 75 and make the entire plastic knob and plug assembly integral so that mere rotation of the plastic knob could drive the shaft to effect the clamping and unclamping operations. The disadvantage of this modification, of course, is that inadvertent rotation of the knob would drive the shaft and permit accidental detachment of the handle during use. In the case of the mechanism of FIGS. 1–10 no inadvertent rotation can occur without axially moving the knob 60 to disengage the teeth 68 and 75.

In operating the device of the instant invention with the flared lip pan 2 it is merely necessary to pass the flared lip portion 18 behind the upper clamping member 15 with the plastic knob 60 in the open condition until the portion 18 contacts the top surface 14 on its inner side. It is then necessary to pull the knob 60 axially until the teeth 68 and 75 disengage and to rotate the knob 60 to the right to closed position which will force the operating member or shaft 35 axially forward until the surface 39 on the forward end of the shaft engages and moves the lower clamping means 50 to firmly hold the pan 2 between the clamping elements 15 and 50. Release of the plastic knob to let the spring 88 urge the knob back into engagement with the handle 4, with the teeth 68 and 75 intermeshed, completes the operation such that no inadvertent twisting of the knob will detach the handle. Thus, it will be seen that the embodiment illustrated in FIGS. 1-10 is positively locked and entirely safe during use.

Referring now to FIG. 11, we see a modification of the detachable handle in FIGS. 1-10 for use with the flared lip pan 2. All of the structural elements of the embodiment of FIGS. 1-10 are found in the FIG. 11 modification, but the shape of the body 10 is changed to render a continuous radius from the shoulder 8 on the handle 4 to the end of the flange 15a of the body 10a. The sidewalls 11a and 12a are provided on opposite sides of the top 14a in curved form such that the holder 22a must also assume a substantially tapered conformation particularly at its sidewalls 23a and 24a so that they may be nested against and spot welded directly to the walls 11a and 12a respectively.

Mechanically, the configuration of FIG. 11 operates exactly as that of FIGS. 1-10 so no detailed discussion is necessary. It will be seen that in either of the modifications of FIGS. 1-10 or FIG. 11 the locking pin or lower clamping member 50a may assume a generally concave contour such that a greater area of contact with the curved flared lip of the pan 2 will be effected. For this reason it will be seen that the modification of the element 50a in FIG. 11 may be desirable when larger diameter pans are used because of the increased area of contact that the contour of the clamping element or pin 50a permits. The clamping elements 50 and 50a may be metal or synthetic plastics or a metal roller covered with plastic with the controlling factor being the difficulty of accomplishing a positive and firm lock if the retaining pin 50 or 50a is a of soft plastic and the probability of marring the pan lip 18 if metal is used. For maximum safety, however, it is preferred to use a metal locking pin 50 or 50a in connection with the various embodiments of the invention.

FIG. 12 illustrates an embodiment of the invention for use with vessels having a handle extension lip on the rim or body of the vessel. This embodiment of the invention is the same in mechanical principle as the previously described embodiment, but certain of the elements are modified in shape to fit on the handle extension type of lip as opposed to the flared lip of the pan 2. The cooking vessel 102 in FIG. 12 is a casserole dish or other similar item of cooking ware having a handle extension portion or lip 103 as best illustrated in FIG. 14.

From a mechanical standpoint the groove 104 is equivalent for handle attaching purposes to the underside or outside of the pan 2 at the point where the sidewall 17 and flared lip 18 merge. A metal handle body 110 is mounted on an extension 6 of a handle 4 having the same configuration as the handle 4 of the embodiment shown in FIGS. 1-10. The handle body 110 is of the same general configuration of the handle body 10a of FIG. 11 in that it has a top surface portion 114 corresponding to the top surface portion 14a thereof which acts also as the fixed element during the clamping of the detachable handle to the dish 102. Since the handle or lip 103 of the dish or casserole 102 has a gently curving sidewall construction which merges into the body of the dish 102, the sidewalls 111 and 112 of the metal handle body 110 are arcuate in shape to conform with the tapered and slightly arcuate extension portion 6 of the handle 4 and the arcuate sidewalls of the dish lip 103. The locking pin holder 122 corresponding to the previously described holder 22a has a similar taper and is nested within the walls 111 and 112 of the metal handle body 110 such that the walls 123 and 124 of the locking pin holder are nested within the sidewalls 111 and 112 respectively of the metal handle body and secured therein as by spot welding, except in the areas where depressions 127 and 128 in the walls 123 and 124 respectively are provided. Depressions 127 and 128 are such that headed pins 129 and 130 respectively may be mounted in slots 131 and 132 provided therein with the clamping element 150 movably mounted on the pins 129 and 130 within the metal handle body structure.

It will be seen that by the direct mounting of the locking pin 150 to the locking pin holder by way of pins 129 and 130 moving in the slots 131 and 132, the path and extent of motion of the locking pin 150 is dictated by the shape and orientation of the slots. As best seen in FIG. 14, the slot 131 and its mirror image 132 has its uppermost end so spaced from the topmost surface 114 of the metal handle body 110 that when the pin 150 is at the uppermost position of the location in the slots, the pin 150 is firmly seated within the groove 104 in the handle lip 103 of the dish 102. The slots are of such extent that the lower movable clamping member or locking pin 150, when the shaft 35 is in its retracted or open position, is permitted to slide downwardly away from the top surface and fixed clamping element 114, so as to provide adequate clearance for the projection 105 on the handle extension lip 103 to pass therebetween.

It will be seen that the shaft or operating member 35 co-operates with the locking pin holder 122 and the locking pin or lower clamping element 150 in substantially the same manner as the co-operation described in detail in connection with FIGS. 1-10. It will further be seen that the opposite end of the handle 4 and the shaft 35 will be related in the same way as described in that connection. The important difference of this embodiment is the adaptation of the holder 122 for direct limitation of the path of movement of the movable clamping element or locking pin 150 in the direction of the fixed clamping element 114, such that the structure provides sufficient clearance for the handle extension lip 103 to pass between the elements 114 and 115 and be positively clamped therebetween by means of the seating of element 150 in the groove 104 in the bottom of the lip 103. In this latter described embodiment it will be seen that a hole 135 corresponding to the hole 32 of FIGS. 1-10 is provided for cooperation with the flat 37 of the shoulder 38 on the shaft 35 to limit the forward axial movement of the shaft.

From these described embodiments and modifications, it will be readily recognized that with minor changes to adapt the detachable handle to a particular class of cooking ware, the novel mechanical principles of the present invention may be used for simple flared lip pans or dishes or for pans or dishes having handle extension lips on their rims or body portions. The common mechanical operation produced according to the principles of this invention may then appear in other embodiments where the lip to which the detachable handle is to be fastened has still other minor structural variations from these specifically described in connection with the illustrated embodiments. Moreover, it will be noted that it would be possible to expose the rivets 29 and 30 or the pins 129 and 130 to the exterior of the metal handle body, if it were desired, but the advantage of having the entire working mechanism mounted within a metal handle body which also functions as the fixed clamping element lies in the aesthetic appeal to the consumer.

It is also contemplated in connection with the embodiment of FIGS. 1-11, that a slotted shaft and pin arrangement could be utilized to replace the rivets 29 and 30 while still retaining the necessary limitation on the lateral movement of the locking pin 50 relative to the operating member 35.

For ease of description the principles of the invention have been set forth in connection with but a few of the illustrated embodiments and modifications. It is not intended that the illustrated embodiments nor the terminology employed in describing them be limited inasmuch as variations in these may be made without departing from the spirit of the invention.

We claim:

1. A positive lock drive means for axially moving an operating member nonrotatably mounted in the bore of an elongated body comprising:
    rigidly mounted locking teeth extending from one end of said elongated body,
    a counterbored portion in the bore of said body at said one end,
    a rotatably mounted and axially fixed plug means projecting from said counterbored portion and having a coaxial bore surrounding a threaded portion of said operating member,
    means in said plug bore in driving engagement with said threaded portion,
    driven spline teeth on the outer surface of said plug means in engagement with a hollow internally splined axially movable knob telescoped over the portion of said plug means projecting from said counterbore,
    said knob having rigidly mounted locking teeth on an end thereof adjacent said elongated body for engagement with the locking teeth extending from said one end of said body,
    and spring means mounted between a portion of said plug and a portion of said knob normally urging the locking teeth of said body, whereby manually applied axial force on said knob will disengage said locking teeth and permit rotation of said knob and corresponding axial motion of said operating member.

2. The positive lock drive means of claim 1 in which the means in said plug bore in driving engagement with said threaded portion of said operating member is a pin mounted in a blind bore in said plug which intersects said plug bore at an angle to the axis thereof substantially equal to the helix angle of said threaded portion.

3. The positive lock drive means of claim 1 in which the operating member is limited in axial movement in one direction within said plug by the end of the plug bore opposite said elongated body.

4. The positive lock drive means of claim 1 in which the operating member is driven by means of threads in said plug bore.

5. A detachable handle for cooking vessels having a lip thereon comprising:
    an elongated insulating handle member having an element on one end thereof which defines a body member,
    an elongated bore extending from said one end to the opposite end of said handle member,
    said body member having spaced sidewalls and a first lip engaging means therebetween,
    second lip engaging means mounted between said walls on a U-shaped bracket in opposing spaced relation to said first lip engaging means for limited movement towards said first means, and capable of limited pivotal and axial movement relative to said operating member,
    an elongated operating member projecting from said bore and nonrotatably mounted in said bore for axial movement into and out of engagement with said second lip engaging means intermediate its ends for said second means laterally towards said first means thereby to exert a clamping force on a vessel lip inserted therebetween, and
    means for selecitvely actuating said operating member over a range of axial positions.

6. The detachable handle of claim 5 in which a holder is mounted with its opposite sides rigidly attached to the spaced sidewalls of the body member and the axial movement of said bracket is limited by members extending through the sides of said bracket and said holder.

References Cited
UNITED STATES PATENTS 3,186,026    6/1965    Serio _____ 294—31 X BOBBY R. GAY, Primary Examiner D. L. TROUTMAN, Assistant Examiner U.S. Cl. X.R.

294—31